United States Patent Office 3,352,789
Patented Nov. 14, 1967

3,352,789
STABILIZATION OF CHLOROFLUOROALKANES
Edward R. Degginger, Syracuse, N.Y., and William A. Knapp, Montclair, and Hans E. Zuern, Parsippany, N.J., assignors to Allied Chemical Corporation, New York, N.Y., a corporation of New York
No Drawing. Filed Jan. 10, 1964, Ser. No. 336,862
7 Claims. (Cl. 252—171)

This invention relates to the stabilization of chlorofluoroalkanes such as trichlorofluoromethane and particularly to compositions comprising chlorofluoroalkanes and stabilizers which inhibit the reaction between the chlorofluoroalkanes and primary and secondary alcohols.

Aerosol formulations containing trichlorofluoromethane and ethyl alcohol have become important commercial products. A reaction occurs between trichlorofluoromethane and alcohols, particularly when air is essentially absent. Among the products formed in this reaction are acetaldehyde and hydrogen chloride. Acetaldehyde has an objectionable odor and forms colored odoriferous condensation products, and the hydrogen chloride attacks the aerosol container causing it to leak.

Mixtures of trichlorotrifluoroethanes and tetrachlorodifluoroethanes with primary and secondary alcohols are used as solvents for cleaning sensitive equipment and for removing coatings from printed electrical circuits. These chlorofluoroalkanes react with the alcohols to form undesirable condensation products and hydrogen chloride.

In the production of urethane polymers, diisocyanates are reacted with polyhydric alcohols to form high molecular weight polymers containing the urethane linkage. If foamed polymers are desired, a "blowing agent," generally trichlorofluoromethane, is added to the diisocyanate or the polyhydric alcohol (polyol) or both. Since the blowing agent is volatile, its vaporization due to the heat of reaction produces a foamed polymer of low density.

Polyols employed for urethane foam production may be divided into two classes: non-amine polyols or amine-based polyols. The non-amine polyols contain carbon, hydrogen and oxygen only. Polyols which fall into the amine-based group contain nitrogen in addition to the other three elements and are generally tertiary amines derived from ethylene amines.

If the ingredients employed for making urethane foams are mixed and used immediately, preparation of a urethane foam having suitable properties creates no problems. Frequently, however, urethane foams must be prepared at locations not equipped with mixing and metering devices to properly proportion the amounts of diisocyanate, polyol, catalyst, emulsifier, blowing agent, etc., required for foam production. It has, therefore, been found efficacious to place the required amount of diisocyanate in one container and the proper proportional quantities of polyol, blowing agent, catalyst, emulsifier, etc., in a second container so that the contents of the two containers can be mixed subsequently to produce satisfactory foam. The two containers must be capable of being stored over extended time without reaction or degradation which will affect the quality of the foam product. This procedure is reasonably successful with non-amine polyols provided normal temperatures are encountered. In the case of the amine-based polyols, however, a reaction between the polyol and blowing agent occurs which leads to darkening of the solution, increased viscosity and the production of poor quality foams, i.e. foams which are darker in color and frequently are coarse and/or possess non-uniform cell size.

Two mechanisms of the reaction between the polyol and blowing agent, as exemplified by trichlorofluoromethane, may be postulated: (1) the hydrolysis of trichlorofluoromethane in the presence of a small quantity of moisture to form acid or (2) the catalyzed free radical reaction between trichlorofluoromethane and hydroxy groups of the polyol to form products including dichlorofluoromethane, aldehydes and acids. The acids may cause intercondensation of molecules of the polyol, or the aldehydes may intercondense to produce larger molecules of complicated and unknown structure. In any event, whatever the mechanism, the solution darkens, increases in viscosity and produces poor quality foams.

An object of the present invention is to provide stabilizers of inhibiting the reaction between chlorofluoroalkanes and primary and secondary alcohols.

Another object of the invention is to provide new compositions of matter comprising chlorofluoroalkanes and the stabilizers.

A more specific object of the invention is to provide stabilizers for inhibiting the reaction between trichlorofluoromethane and polyols, as well as compositions comprising trichlorofluoromethane and the stabilizers.

Other objects and advantages of the invention will appear hereinafter.

According to the invention, a composition resistant to reaction with primary and secondary alcohols consists essentially of a chlorofluoroalkane of the group consisting of trichlorofluoromethane, trichlorotrifluoroethanes and tetrachlorodifluoroethanes and from about 0.1% to about 5% by weight of an unsaturated organic compound selected from the group consisting of alpha-methylstyrene, dipentene, anethole, indene, dimethyl hexadiene (e.g. 2,5-dimethyl hexadiene-2,4), piperylene, p-mentha-1,5-diene, meta-diisopropenylbenzene, 1,3,5-triisopropenylbenzene, 1-(p-methoxyphenyl)-2-nitro-1-propene and 1-methoxy-1,3-butadiene, and mixtures of any two or more thereof. The structural formulas of these compounds are set forth below:

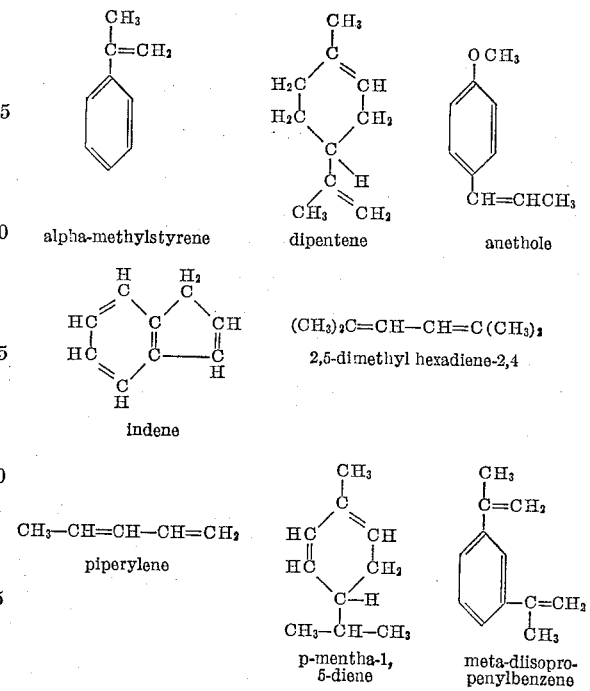

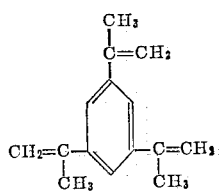

1,3,5-triiso-propenylbenzene

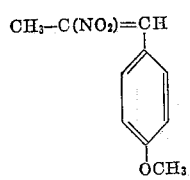

1-(p-methoxyphenyl)-2-nitro-1-propene

CH₂=CH—CH=CH(OCH₃)

1-methoxy-1,3-butadiene

Although other unsaturated organic compounds are known to inhibit the reaction between chlorofluoroalkanes and primary and secondary alcohols, the effectiveness of such compounds is unpredictable. Thus, numerous unsaturated organic compounds closely related to the compounds set forth above have been found to be relatively ineffective for the purpose of the present invention.

The primary and secondary alcohols comprise monohydric and polyhydric alcohols in which at least one alcoholic hydroxyl group is attached to a primary or a secondary carbon atom. In aerosol formulations and in solvent mixtures the alcohols concerned are the primary and secondary alkanols which are normally liquid. Preferably, the alkanols contain from 1 to 4 carbon atoms and may be exemplified by methanol, ethanol, propanol, isopropanol, n-butanol, ethylene glycol, propylene glycol, sorbitol, etc. In the preparation of urethane foams the alcohols involved are primary and secondary non-amine polyols and amine-based polyols. These polyols generally contain ether groups and may contain carboxylic ester groups. Typical examples of the non-amine polyols are reaction products of ethylene and/or propylene oxide with materials such as sucrose, pentaerythritol, sorbitol, trimethylol propane, and methyl glucoside. Representative of the amine-based polyols are N,N,N',N'-tetrakis (2-hydroxypropyl) ethylene diamine, and reaction products of ethylene and/or propylene oxide with diethylene triamine.

The chlorofluoroalkanes comprise trichlorofluoromethane, 1,1,2-trichloro-1,2,2-trifluoroethane, 1,1,1-trichloro-2,2,2-trifluoroethane, 1,1,2,2-tetrachloro-1,2-difluoroethane and 1,1,1,2-tetrachloro-2,2-difluoroethane.

The stabilizers of this invention are employed in amounts ranging from about 0.1% to about 5% by weight of the chlorofluoroalkane. Preferably the amount varies between 0.1% and 1.0% by weight of the chlorofluoroalkane. Smaller amounts of stabilizer are less effective while larger amounts produce no further advantage and tend to become uneconomical.

The stabilizers are soluable in the chlorofluoroalkanes. As desired, the stabilizers can be added to the chlorofluoroalkane or to compositions containing both the chlorofluoroalkane and the alcohol.

The following examples illustrate testing and evaluation of the stabilizers.

Example 1

To measure the effectiveness of dipentene as stabilizer, solutions comprising equal parts by weight of N,N,N',N'-tetrakis (2-hydroxypropyl) ethylene diamine and trichlorofluoromethane, "as is" and with 0.5% by weight of dipentene (basis trichlorofluoromethane), were stored at 130° F. and also at room temperature. The original solutions were water-white and had a viscosity of 30 centipoises at 73° F. Storage for 1 week at 130° F. produced color change and viscosity increases approximately equivalent to those observed from storage at room temperature for about 6 weeks. Viscosity and color of the solutions after storage were as follows:

| Stabilizer | Viscosity at 73° F. After 1 Week at 130° F. (Centipoises) | Viscosity at 73° F. After 6 Weeks at Room Temperature (Centipoises) | Color |
|---|---|---|---|
| None | 122 | 100 | Dark brown. |
| Dipentene | 39 | 43 | Water-white. |

Example 2

In further tests, 175 parts by weight of N,N,N',N'-tetrakis (2-hydroxypropyl) ethylene diamine were mixed with 175 parts by weight of trichlorofluoromethane containing 0.875 part by weight of the indicated stabilizer. The resulting solutions were then stored for 2 weeks at 130° F., equivalent to approximately 3 months' storage at room temperature. Before storage the solutions were water-white and had a viscosity of 30 centipoises. Viscosity and color of the solutions after storage were as follows:

| Stabilizer | Viscosity at 73° F. (Centipoises) | Color |
|---|---|---|
| None | 240 | Dark brown. |
| Indene | 34.5 | Pale yellow. |
| Anethole | 33.2 | Water-white. |
| Alpha-methyl-styrene | 32.0 | Do. |
| 2,5-dimethyl hexadiene-2,4 | 29.5 | Very pale yellow. |
| Piperylene | 33.2 | Water-white. |
| p-Mentha-1,5-diene | 32.0 | Pale yellow. |
| Meta-diisopropenyl-benzene | 31.0 | Water-white. |
| 1,3,5-triisopropenyl-benzene | 32.0 | Do. |
| p-(p-Methoxyphenyl)-2-nitro-1-propene | 32.5 | Yellow. |
| 1-methoxy-1,3-butadiene | 28.0 | Do. |

Example 3

To show that stabilizers of this invention would not adversely affect urethane foam quality each of the stabilizers of Example 2 was incorporated into a premix comprised of 100 parts by weight of the reaction product of pentaerythritol with propylene oxide having a hydroxyl number of about 450, 40 parts by weight of the reaction product of diethylene triamine with propylene oxide having a hydroxyl number of about 700, 2.7 parts by weight of catalysts and emulsifiers consisting of aliphatic and heterocyclic amines, organic tin compounds and a silicone type emulsifier, 50 parts by weight of trichlorofluoromethane and 0.25 part by weight of the indicated stabilizer. After storage for two weeks at 130° F., 110 parts by weight of the aged premix were combined with 98.6 parts by weight of crude toluene diisocyanate. The materials were mixed for 15 seconds, poured into a suitable container and allowed to react. Data on characteristics of the premix and the resulting foam are as follows:

| Stabilizer | Viscosity at 74° F. (Centipoises) | Cream Time [1] (Seconds) | Tack Free Time [2] (Seconds) | Foam Density | Cell Structure |
|---|---|---|---|---|---|
| None | 800 | 70 | 300 | 1.95 | Poor. |
| Anethole | 520 | 15 | 60 | 1.77 | Good. |
| Indene | 520 | 15 | 50 | 1.80 | Do. |
| 2,5-dimethyl hexadiene-2,4 | 483 | 14 | 53 | 1.78 | Do. |
| Piperylene | 456 | 17 | 48 | 1.78 | Do. |
| P-mentha-1,5-diene | 458 | 14 | 43 | 1.76 | Do. |
| Meta-diisopropenylbenzene | 460 | 14 | 50 | | Do. |
| 1,3,5-triisopropenylbenzene | 450 | 15 | 48 | | Do. |
| Alpha-methyl styrene | 455 | 14 | 41 | 1.77 | Do. |

For footnotes see following table.

Similarly prepared premixes were stored at room temperature for two and a half months. Data on characteristics of the premix and the resulting foam are as follows:

| Stabilizer | Viscosity at 74° F. (Centipoises) | Cream Time [1] (Seconds) | Tack Free Time [2] (Seconds) | Foam Density | Cell Structure |
|---|---|---|---|---|---|
| 2,5-dimethyl hexadiene-2,4 | 459 | 12 | 45 | 1.63 | Good. |
| P-metha-1,5-diene | 493 | 13 | 45 | 1.65 | Do. |
| Alpha-methlystyrene | 520 | 12 | 40 | 1.65 | Do. |
| Anethole | 468 | 13 | 45 | 1.63 | Do. |
| Indene | 495 | 13 | 43 | 1.61 | Do. |
| Meta-diisopropenylbenzene | 332 | 14 | 45 | 1.75 | Do. |
| 1,3,5-triisopropylbenzene | 328 | 14 | 40 | 1.75 | Do. |

[1] Cream time is the time elapsed between initiation of mechanical agitation (or mixing) applied to the combined components of the urethane foam system and the first appearance or evidence of gas formation.
[2] Tack free time is the time required, starting with initiation of mixing of foam components, for the foam to cream, rise, become firm and form a top surface or "skin" that is not sticky or tacky.

*Example 4*

150 parts by weight of N,N,N',N'-tetrakis(2-hydroxypropyl) ethylene diamine were mixed with 150 parts by weight of 1,2,2-trichloro,1,1,2-trifluoroethane and 0.75 part by weight of the indicated stabilizer. These solutions were stored for two weeks at 130° F. The color and viscosity of the aged solutions are given below:

| Stabilizer | Viscosity at 60° F. (Centipoises) | Color |
|---|---|---|
| None | 392 | Dark brown. |
| Meta-diisopropenylbenzene | 137 | Very pale yellow. |
| Alpha-methylstyrene | 130 | Do. |

*Example 5*

150 parts by weight of N,N,N',N'-tetrakis (2-hydroxypropyl) ethylene diamine, 75 parts by weight of a mixture of 1,1,2,2-tetrachloro-1,2-difluoroethane and 1,1,1,2-tetrachloro-2,2-difluoroethane and 75 parts by weight of trichlorofluoromethane were mixed with 0.75 part by weight of the indicated stabilizer. These solutions were stored for two weeks at 130° F. The color and viscosity of the aged solutions are given below:

| Stabilizer | Viscosity at 60° F. (Centipoises) | Color |
|---|---|---|
| None | *27,000 | Dark brown. |
| Meta-diisopropenylbenzene | 97.5 | Very pale yellow. |
| Alpha-methylstyrene | 86.0 | Do. |

*This sample formed two layers on aging. The viscosity of the upper layer was recorded.

*Example 6*

3 parts by weight of the reaction product of diethylene triamine with propylene oxide having a hydroxyl number of about 475, 1 part by weight of trichlorofluoromethane and 0.005 part by weight of the indicated stabilizer were mixed and stored for 3 weeks at 130° F. The viscosity of the aged solutions is given below:

Stabilizer:     Viscosity at about 72° F. (centipoises)
- None _____ 1310
- Indene _____ 761
- Anethole _____ 710
- Meta-diisopropenylbenzene _____ 652
- p-Mentha-1,5-diene _____ 880
- Alpha-methylstyrene _____ 707
- Piperylene _____ 620

Urethane foams were prepared using the above aged solutions. The resulting foams exhibited excellent cream time and tack free time characteristics.

*Example 7*

The indicated stabilizer was dissolved at the desired concentration in denatured ethyl alcohol. 85 parts by weight of trichlorofluoromethane were added to 30 parts by weight of alcohol solution of stabilizer in a tin-plated steel aerosol container, and excess trichlorofluoromethane was allowed to boil off to expel air until the mixture contained about 70 parts by weight of trichlorofluoromethane and 30 parts by weight of the alcohol solution containing the stabilizer. The aerosol container was then capped and stored in a constant temperature oven at 110° F. Containers were sacrificed for inspection at monthly intervals with the following results:

| Stabilizer | Weight Percent of Stabilizer in Trichlorofluoromethane | Results of Storage at 110° F. | | | | | |
|---|---|---|---|---|---|---|---|
| | | One Month | | Two Months | | Three Months | |
| | | Odor | Corrosion | Odor | Corrosion | Odor | Corrosion |
| None | 0 | Sour | 4 | Offensive | 5 | (*) | (*) |
| Anethole | 0.30 | No change | 0 | No change | 1 | Slightly sour | 2 |
| Indene | 0.30 | do | 0 | do | 0 | No change | 1 |
| p-Mentha-1,5-diene | 0.30 | do | 0 | do | 1 | do | 2 |
| Alpha-methylstyrene | 0.30 | do | 0 | do | 0 | do | 1 |

*Containers leaked and were destroyed before end of test period.

The following grades were used for evaluation of visual attack:

0 = No visual change
1 = Minimal discoloration or very slight etching
2 = Mild attack on metal, no precipitate, slight corrosion
3 = Moderate attack on metal, slight precipitate
4 = Extreme attack on metal accompanied usually by heavy precipitate
5 = Bulging and/or preforation of the container A stabilizer was considered satisfactory if no foreign odor was produced and if metal attack was slight (grade 2 or lower).

Since various changes and modifications may be made in this invention without departing from the spirit thereof, the invention is to be taken as limited only by the scope of the appended claims.

We claim:

1. A composition resistant to reaction with primary and secondary alcohols which consists essentially of at least one of a chlorofluoroalkane of the group consisting of trichlorofluoromethane, trichlorotrifluoroethanes and tetrachlorodifluoroethanes and from about 0.1 to about 5% by weight based on the chlorofluoroalkane at least one of an unsaturated organic compound of the group consisting of anethole, indene, dimethyl hexadiene, piperylene, meta-diisopropenylbenzene, 1,3,5-triisopropenylbenzene, 1-(p-methoxyphenyl)-2-nitro-1-propene and 1-methoxy-1,3-butadiene.

2. A composition resistant to reaction with primary and secondary polyols which consists essentially of trichlorofluoromethane and from about 0.1% to about 5% by weight based on the trichlorofluoromethane of at least one of an unsaturated organic compound of the group consisting of anethole, indene, dimethyl hexadiene, piperylene, meta-diisopropenylbenzene, 1,3,5-triisopropenylbenzene, 1-(p-methoxyphenyl)-2-nitro-1-propene and 1-methoxy-1,3-butadiene.

3. A composition resistant to reaction with amine-based primary and secondary polyols which consists essentially of trichlorofluoromethane and from about 0.1% to about 5% by weight based on the trichlorofluoromethane of meta-diisopropenylbenzene.

4. A composition resistant to reaction with amine-based primary and secondary polyols which consists essentially of trichlorofluoromethane and from about 0.1% to about 5% by weight based on the trichlorofluoromethane of piperylene.

5. A composition resistant to reaction with amine-based primary and secondary polyols which consists essentially of trichlorofluoromethane and from about 0.1% to about 5% by weight based on the trichlorofluoromethane of 1,3,5-triisopropenylbenzene.

6. A composition resistant to reaction with amine-based primary and secondary polyols which consists essentially of trichlorofluoromethane and from about 0.1% to about 5% by weight based on the trichlorofluoromethane of 2,5-dimethyl hexadiene-2,4.

7. A composition consisting essentially of at least one of primary and secondary polyols, which polyol is useful for preparing polyurethane foams by reaction with diisocyanates in the presence of a chlorofluoroalkane blowing agent, having dissolved therein at least one chlorofluoroalkane blowing agent of the group consisting of trichlorofluoromethane, trichlorotrifluoroethanes and tetrachlorodifluoroethanes, which chlorofluoroalkane contains from about 0.1% to about 5% by weight based on the chlorofluoroalkane of at least one of an unsaturated organic compound of the group consisting of anethole, indene, dimethyl hexadiene, piperylene, meta-diisopropenylbenzene, 1,3,5-triisopropenylbenzene, 1-(p-methoxyphenyl)-2-nitro-1-propene and 1-methoxy-1,3-butadiene.

References Cited

UNITED STATES PATENTS

| 3,090,818 | 5/1963 | Long | 252—171 X |
| 3,183,192 | 5/1965 | Bauer | 252—171 X |
| 3,257,326 | 6/1966 | Fullhart et al. | 252—171 |

OTHER REFERENCES

The Condensed Chemical Dictionary (5th edition) 1956, Rheinhold Pub. Corp., New York, pages 84, 588 and 392.

LEON D. ROSDOL, Primary Examiner.

JULIUS GREENWALD, Examiner.

J. T. FEDIGAN, Assistant Examiner.